Levy & Jones,
Frosting Glass,
N° 9,453.    Patented Dec. 7, 1852.
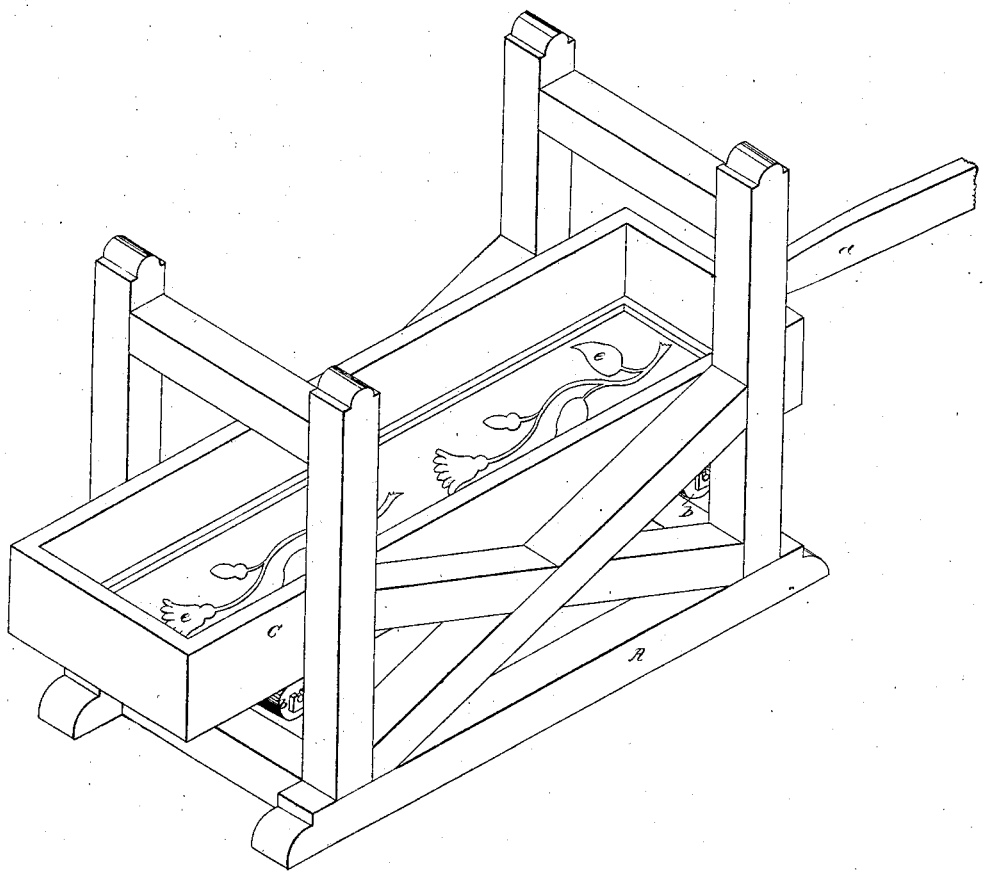

UNITED STATES PATENT OFFICE.

J. LEVY AND C. JONES, OF NEW YORK, N. Y.

MODE OF FROSTING GLASS.

Specification of Letters Patent No. 9,453, dated December 7, 1852.

*To all whom it may concern:*

Be it known that we, JOHN LEVY and CHARLES JONES, of the city, county, and State of New York, have invented certain new and useful Improvements in Machinery for Frosting and Figuring Plates of Glass; and we do hereby declare that the following is a full, clear, and exact description of the same, reference being made to the annexed drawing, making a part of this specification, which is an isometrical view of our apparatus.

Our invention consists in certain improvements in machinery and the application of models or patterns for the ornamenting of glass plates and other material capable of being acted upon by attrition or friction. As applied by us to glass it consists in forming ornaments in very low relief upon a frosted ground, the ornamental figures being left of the natural transparency of the glass, or the reverse of this may be made, the figures being in "intaglio," or depressed below the general surface. The "frosting" is effected by the usual mixture of sand and gravel moistened with water, but our manner of applying it is a part of the present invention.

That our improvements may be the better understood we deem it proper to state briefly the old modes.

The chief application of this material has been to frost the interior of glass globes for lamp shades, &c. The plan was to put the mixture of sand, gravel, and water within the globe and keep that slowly rotating until all the interior surface was properly scratched or ground. When the shade was further ornamented, it was by cutting figures upon the outside in the usual manner of glass cutting.

We are aware that a method of ornamenting plates of glass has been proposed by placing the same within a rocking trough, and by canting the trough from side to side gradually effect the scratching of the surface by the friction of the sand and pebbles.

The stiffness of the pasty mass formed by the grinding ingredients is such that this is a very slow process. Afterward when the glass is to be further ornamented it is cut by the grinding tools in the usual way.

In our improvements we effect the ornamenting of the plates of glass and the frosting at a single operation and with very great speed, after the following manner: We first construct a strong frame, as seen at A. Between the main uprights we put rollers lying horizontally and at the same height, as shown at (*b*). Upon these rollers we lay an oblong trough, water tight, as seen at C. This trough is intended to be rapidly agitated by short horizontal strokes. This is produced by a pitman (*d*) connected with a crank or other mechanical device for effecting this end. The plate of glass to be acted upon is then laid in the trough and secured firmly to its bottom. If the frosting only is to be done, sand and gravel is put in in sufficient quantity for the purpose and moistened with water only so far as to make a stiff pasty mass. The trough is then put in rapid vibration until the frosting is completed. The theory of the operation is this: The agitation is intended to be of such a velocity as to withdraw the glass away from the particles of sand, &c., before those acquire any considerable motion, so that the glass is arbitrarily thrust back and forth against the sand and thereby a much greater amount of surface is passed over in the same space of time than would be were the sand to be made to travel by its own gravity, and consequently a largely increased amount of work is effected. This arrangement also permits of a great number of pieces being acted upon at once. The glass when frosted may be ornamented by the usual modes. When figures and ornaments are to be applied we use the following process which forms the second part of our invention: Previous to putting the glass plate into the trough we determine the design for ornamenting and also whether it shall be in "relief" or "intaglio." For a relief, we cut a pattern of some thin metallic substance, as sheet copper, (or any substance which will resist the abrading action of the grinding materials in the trough,) say a vine or wreath of leaves and flowers. This pattern we cement to the surface of the glass (as seen at the letter *e*) on the parts we wish it worked. Then the plate, as before, is secured to the bottom of the trough, with the surface upward on which the metal pattern is. Sand, &c., being put in, the whole is prepared and worked as before described for plain glass. It will now be seen that the metal pattern secures all the glass which it covers from the abrading action of the grinding materials, while the rest of the surface is being frosted and slightly reduced in thickness. The process being complete, the glass is taken out, the copper plate removed, and the ornament is found in very low relief upon the surface. The "intaglio" figures are effected by a reverse of this arrangement, that is to say, if instead of putting on the patterns cut out of the plate before described we should now put on the glass the other part, or the piece from which that was taken, and then proceed as before, we should have all that part of the glass which was ground before now protected and the same figures now produced below the surface by grinding.

Very many combinations may be produced by our mode, for both sides of the glass may be acted on alternately, and by a skilful arrangement of the patterns the two sides may be worked into figures having a great variety in light and shade as well as outline.

What we claim as our invention and desire to secure by Letters Patent is—

1. Frosting and figuring glass by fixing the plates to be treated in a trough or vessel containing sand, pebbles, and water and subjected to a short quick vibratory motion in a longitudinal direction by any suitable mechanical movement, thus causing the glass to pass through the mass of gritty material before any considerable momentum is imparted to that mass, as more fully set forth herein.

2. We claim forming ornaments upon the glass by the application of patterns or designs in connection with the process of frosting by the action of the sand and pebbles substantially as set forth herein.

JOHN LEVY.
CHARLES JONES.

Witnesses:
S. H. MAYNARD,
L. W. BRAINARD, Jr.